W. S. HOUSER.
RESILIENT WHEEL.
APPLICATION FILED JUNE 17, 1910.
970,229.
Patented Sept. 13, 1910.
2 SHEETS—SHEET 2.
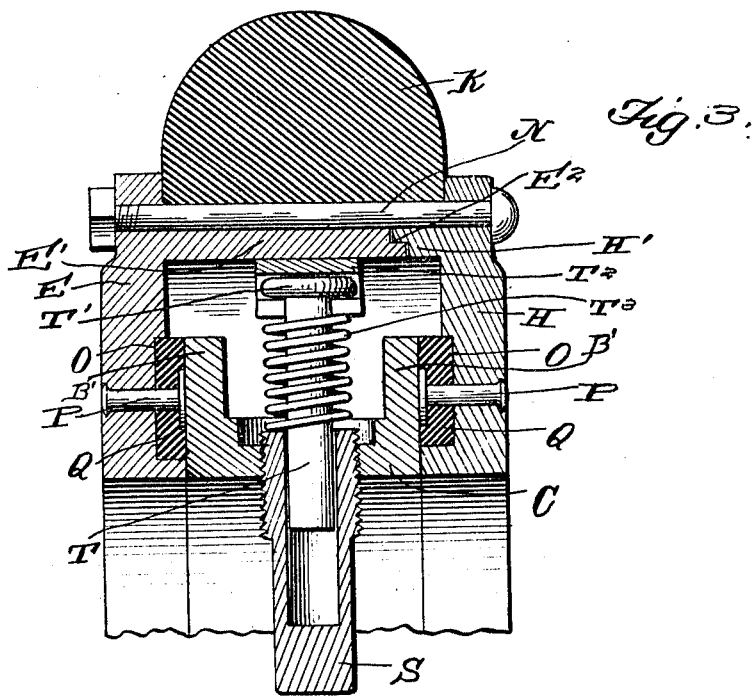
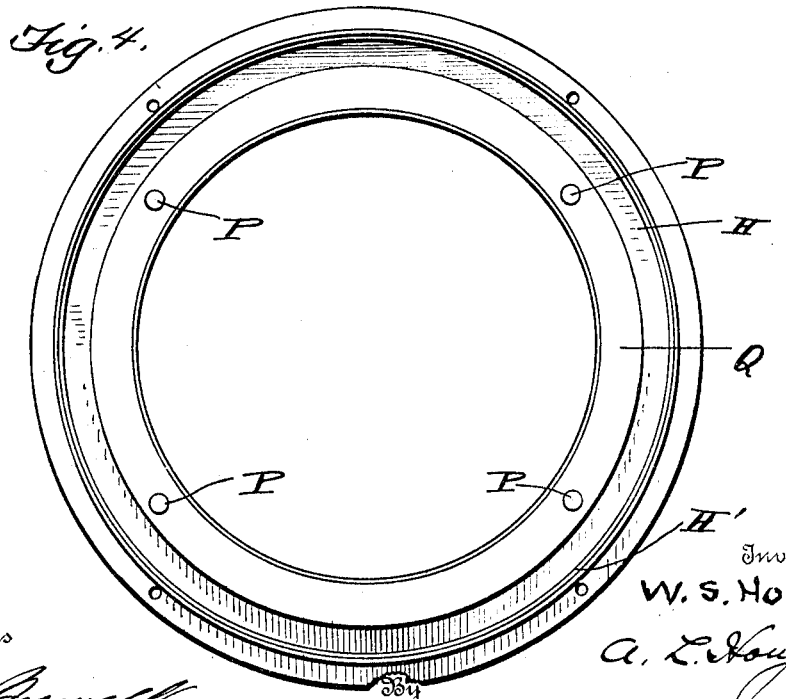

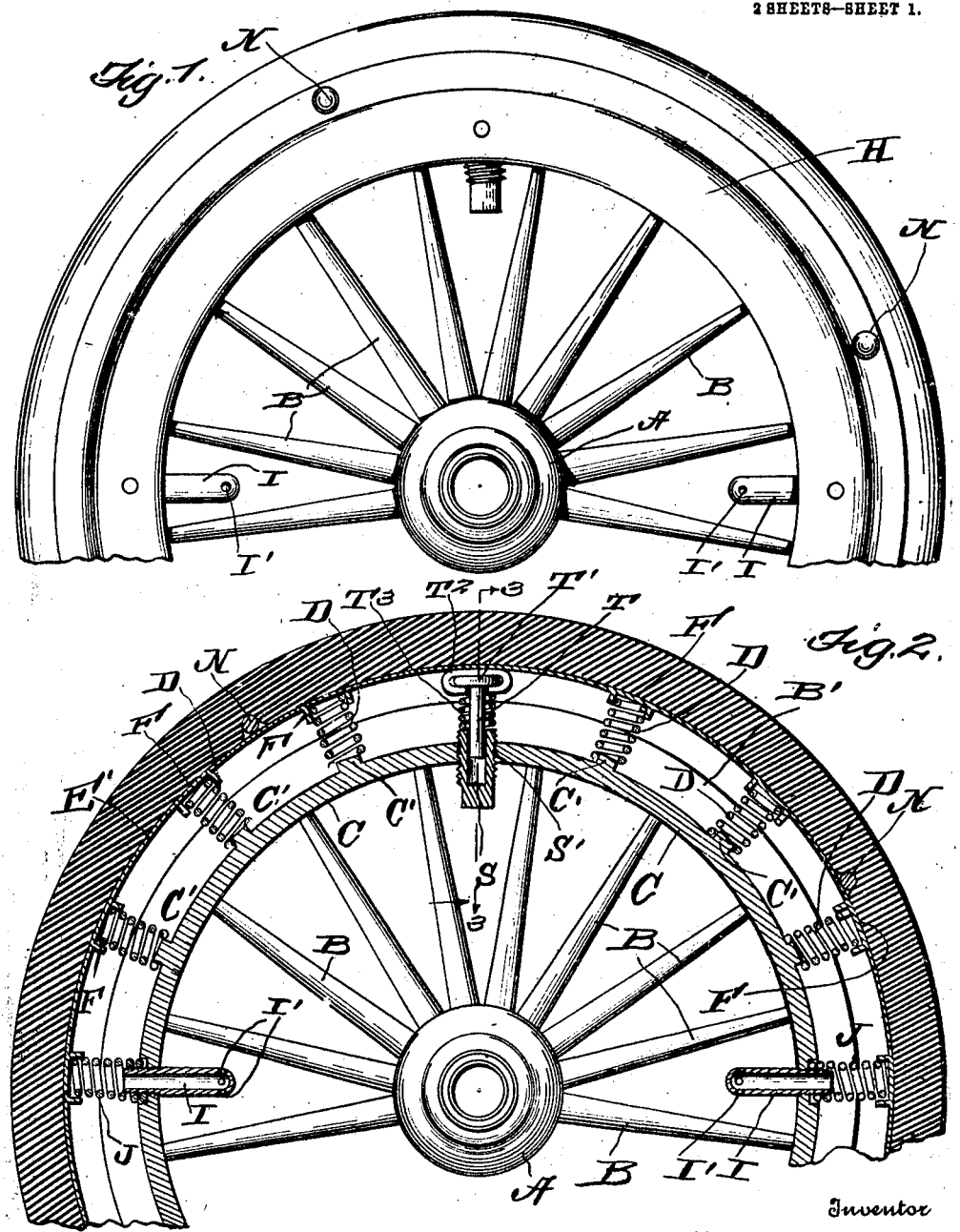

UNITED STATES PATENT OFFICE.

WINFIELD S. HOUSER, OF DUBOIS, PENNSYLVANIA, ASSIGNOR OF ONE-HALF TO WILLIAM G. BROWN, OF DUBOIS, PENNSYLVANIA.

RESILIENT WHEEL.

970,229.  Specification of Letters Patent.  Patented Sept. 13, 1910.

Application filed June 17, 1910. Serial No. 567,606.

*To all whom it may concern:*

Be it known that I, WINFIELD S. HOUSER, a citizen of the United States, residing at Dubois, in the county of Clearfield and State of Pennsylvania, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels, the object in view being to produce a substitute for the expensive pneumatic tire wheel and produce a means for taking up substantially all of the vibration upon the vehicle equipped with the wheel.

My invention comprises various details of construction and combinations and arrangements of parts which will be hereinafter fully described and then specifically defined in the appended claim.

I illustrate my invention in the accompanying drawings, in which:—

Figure 1 is a side elevation of a portion of a wheel made in accordance with my invention. Fig. 2 is a vertical sectional view through the same. Fig. 3 is a sectional view on line 3—3 of Fig. 2, and Fig. 4 is a detail in elevation of one of the rim engaging plates.

Reference now being had to the details of the drawings by letter, A designates the hub of a wheel, B the spokes and C a rim which, as shown in Fig. 3 of the drawings, has flanges B' upon its opposite longitudinal edges and is adapted to receive the outer ends of the spokes. Said rim C is provided with a series of lugs or bosses C' adapted each to engage and hold the inner end of a coiled spring D in place.

E and H designate rings having annular flanges E' and H' respectively which project from the inner faces thereof, the meeting edges of said flanges being shouldered as at E² and engaging each other, as shown in Fig. 3. Projecting from said flange E' at intervals are the lugs F adapted to engage the outer ends of the coiled springs to hold the same in place. A cushion tire K is mounted upon the circumferences of said flanges and held from lateral movement by the rings E and H, bolts N passing through registering apertures in said rings as shown.

The inner face of each ring is recessed as at O for the reception of the fiber wear rings Q which are held in place by means of bolts P passing through apertures in the rings E and H. The inner faces of the wear rings are adapted to contact with the outer faces of the flanges B' of the rim C as the two surfaces move one against the other under tension of the coiled springs.

Referring to Fig. 2 of the drawings will be seen a plug S having a threaded portion engaging a threaded aperture S' formed in the rim C and said plug S is hollow and is adapted to receive the shank portion of the pin T, the head T' of which pin is engaged by a socket plate T² fastened to the inner circumference of the flange E'. A coiled spring T³ is mounted upon the shank portion of said pin and bears between the inner end of the plug S and the socket member T². Said pin T is adapted to hold the rim in place and allow the same to yield against the series of coiled springs arranged about the circumference of the rim. In apertures at different locations about the rim are the tubular members I having apertures I' at their inner ends, while their outer ends are circumferentially threaded and fitted in apertures in the rim and about the projecting ends of the members I are mounted coiled springs J, similar to the springs D, said springs J engaging at their outer ends the lugs F. Said members I are provided for the purpose of allowing air to circulate through into the space intermediate the rim and the flanges E' and H' to keep the springs cool and serving as ventilation for said space.

From the foregoing, it will be noted that, by the provision of an apparatus as shown and described, a simple and efficient means is afforded whereby a vehicle wheel may be constructed so as to take up vibration and dispense with the expensive pneumatic tire commonly employed upon vehicle wheels.

What I claim to be new is:—

A resilient wheel comprising a metallic rim, spokes fixed thereto, series of bosses projecting from the circumference of said rim, flanged rings movable against the opposite edges of the latter, springs interposed between said flanges and rim, the inner ends of said springs engaging said bosses, lugs projecting from the inner face of one of said flanges and engaging the outer ends of the springs, a threaded plug fitted in a threaded aperture in the rim, a socket member upon the inner surface of the flange of one of said rings, a headed pin engaging said socket member and having a shank portion movable within a recess in said plug, a spring interposed between the latter and said socket member, hollow apertured tubes having threaded portions engaging the threaded apertures in the rim, coiled springs engaging the outer ends of said tubes and bearing against the inner circumference of said flanges, a tire about said flanges, and means for holding the rings in place.

In testimony whereof I hereunto affix my signature in the presence of two witnesses.

WINFIELD S. HOUSER.

Witnesses:
W. L. CALKINS,
W. G. BROWN.